(12) United States Patent
Siebke et al.

(10) Patent No.: US 9,841,053 B2
(45) Date of Patent: Dec. 12, 2017

(54) BEARING ASSEMBLY HAVING A BACK-UP BEARING

(71) Applicant: Schaeffler Technologies AG & Co. KG, Herzogenaurach (DE)

(72) Inventors: Peter Siebke, Herzogenaurach (DE); Stefan Ruhl, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 87 days.

(21) Appl. No.: 14/891,516

(22) PCT Filed: Apr. 25, 2014

(86) PCT No.: PCT/DE2014/200183
§ 371 (c)(1),
(2) Date: Nov. 16, 2015

(87) PCT Pub. No.: WO2014/194899
PCT Pub. Date: Dec. 11, 2014

(65) Prior Publication Data
US 2016/0091020 A1    Mar. 31, 2016

(30) Foreign Application Priority Data
Jun. 3, 2013   (DE) .................... 10 2013 210 215

(51) Int. Cl.
*F16C 27/04*    (2006.01)
*F16C 39/02*    (2006.01)
*F16C 32/04*    (2006.01)

(52) U.S. Cl.
CPC .......... *F16C 27/04* (2013.01); *F16C 32/0442* (2013.01); *F16C 39/02* (2013.01)

(58) Field of Classification Search
CPC ....... F16C 27/04; F16C 32/0442; F16C 39/02
See application file for complete search history.

(56) References Cited

U.S. PATENT DOCUMENTS

| | | | | |
|---|---|---|---|---|
| 3,790,240 A | * | 2/1974 | Pitner | F16C 27/04 384/581 |
| 5,567,060 A | * | 10/1996 | Steinberger | F16C 19/466 384/569 |
| 6,062,736 A | * | 5/2000 | Zernickel | F16C 19/46 384/535 |
| 8,734,023 B2 | * | 5/2014 | Ashmore | F16C 27/04 384/513 |

(Continued)

FOREIGN PATENT DOCUMENTS

| | | |
|---|---|---|
| DE | 102006026123 | 1/2008 |
| DE | 102010032111 | 1/2012 |

(Continued)

*Primary Examiner* — Phillip A Johnson
(74) *Attorney, Agent, or Firm* — Volpe and Koenig, P.C.

(57) ABSTRACT

The invention relates to a bearing assembly having a back-up bearing (2), which has an outer ring (4) arranged in a housing construction (12) in a flexible manner. The flexibility has angle-dependent extreme values, namely at least one minimum and at least one maximum. According to the invention, this bearing assembly is characterized in that, within 360° with respect to the circumference of the outer ring (4), there are more than two angles at which there is at least one local extreme value of the flexibility of the outer ring (4).

12 Claims, 7 Drawing Sheets

(56) References Cited

U.S. PATENT DOCUMENTS

| | | | |
|---|---|---|---|
| 2008/0066992 A1* | 3/2008 | Bareis | B62D 5/0448 180/444 |
| 2009/0185769 A1* | 7/2009 | Morton | F16C 25/08 384/563 |
| 2011/0085752 A1* | 4/2011 | Tecza | F16C 32/0442 384/295 |
| 2013/0142470 A1* | 6/2013 | Yoo | F16C 33/30 384/536 |
| 2014/0072253 A1 | 3/2014 | Ruhl et al. | |
| 2014/0072254 A1 | 3/2014 | Pausch et al. | |

FOREIGN PATENT DOCUMENTS

| | | |
|---|---|---|
| DE | 102010035183 | 3/2012 |
| DE | 102011005761 | 9/2012 |
| EP | 1083349 | 3/2011 |
| FR | 2614375 | 10/1988 |
| WO | 2012152539 | 11/2012 |

* cited by examiner

BEARING ASSEMBLY HAVING A BACK-UP BEARING

FIELD OF THE INVENTION

The invention relates to a bearing assembly with a backup bearing. A backup bearing is generally provided to come into operation in the event of the failure of a main bearing constructed, in particular, as a magnetic bearing.

BACKGROUND

A bearing assembly with a backup bearing according to the class is known from DE 10 2011 005 761 A1. A desired flexibility of the backup bearing in the radial direction, with respect to the rotational axis of a supported shaft, is produced in this case such that a housing holding the backup bearing has a slot in the circumferential direction of a bearing ring of the backup bearing. The slot extends, for example, over a circumferential angle of 50° to 180° and has a width of approx. 0.2 mm. If a bearing, in particular, a magnetic bearing, provided for supporting the shaft during proper operation fails, the shaft is caught by the backup bearing, which can cause a load spike on the backup bearing and the housing and blockage of the walls of the slot providing a spring path of approx. 0.2 mm.

Another backup bearing for a magnetic bearing is known from DE 10 2010 035 183 A1. An outer ring of this backup bearing is surrounded by a damping ring that has recesses arranged regularly on its lateral surface. Such a backup bearing is provided, for example, for use in electrical machines or turbochargers.

For damping a bearing ring, in addition to mechanical damping elements, hydraulic damping devices are also known. One example here is disclosed in patent DE 10 2006 026 123 B4 that relates to a method for damping movements of a rotor in the radial direction relative to the rotor axis. A ring gap running around the rotor axis is here filled with a viscous medium that is loaded with different pressures as a function of the operating state of the rotor.

SUMMARY

The invention is based on the objective of providing a bearing assembly with a backup bearing that is adapted especially well to the load states that occur when a main bearing fails.

This objective is achieved according to the invention by a bearing assembly comprising a backup bearing with one or more features of the invention.

The bearing assembly has a backup bearing that comes into operation when a main bearing fails and comprises a flexible outer ring arranged in a housing construction. The backup bearing is advantageously constructed as a radial bearing or at least essentially acting as a radial bearing, wherein the radial stiffness, defined as the reciprocal of the radial flexibility, is dependent on angle. There are more than two angles (within 360°, with respect to the circumference of the outer ring) at which the flexibility of the outer ring has an at least local extreme value, that is, a minimum or a maximum. In principle, the backup bearing could also be formed as an axial bearing, wherein, in this case, the bearing ring that is arranged in the housing construction is designated as an outer ring. In preferred embodiments, the backup bearing is suitable both for receiving radial forces and also for receiving axial forces. Advantageously, the backup bearing is a rolling bearing, for example, a two-row angular contact ball bearing. Sliding bearings or combination rolling/sliding bearings are also suitable as the backup bearing within the bearing assembly. If the backup bearing is formed as a rolling bearing, its rolling bodies, in particular, balls, are preferably arranged without a cage between the bearing rings.

The invention starts from the idea that supporting a shaft by means of a backup bearing is an oscillation excitation. After the operating state becomes non-determinable when the main bearing fails, which triggers the functional takeover by the backup bearing, neither excitation frequencies nor oscillation responses of the bearing assembly can be predicted accurately. In particular, exactly those ranges of operating parameters become non-determinable in which so-called eddying can occur when the backup bearing takes over the function. Here, eddying is understood to be a circulating local shaft center of gravity. In the special case of reverse eddying, bearing parts revolve in the rotational direction opposite that of the shaft in an adjacent part.

It has been shown that eddying can be prevented especially well with a damped bearing assembly in which neither a uniform damping effect is given on the circumference, for example, as per DE 10 2010 035 183 A1, nor a single, limited angular range on the bearing circumference with a flexible construction, as is known, in principle, from DE 10 2011 005 761 A1.

Instead, according to the invention, surprisingly good damping of oscillations is achieved in that the radial stiffness on the circumference of the bearing increases and/or decreases by a multiple. In a preferred construction, an oscillation amplitude dependent on an excitation frequency and/or excitation direction and measured on the outer ring of the backup bearing has at least two maximum points. According to calculations, on the circumference of the backup bearing there are different, angle-dependent resonance frequencies that make sure that strongly pronounced resonance can be produced not for just a single excitation frequency that acts on the backup bearing.

According to one possible construction, the angle-dependent flexibility of the backup bearing, i.e., the deflection capacity of the outer ring of the backup bearing in the radial direction with reference to the applied radial force, gives two minimum and two maximum points within 360°. These two minimum and maximum points of flexibility and thus also the radial stiffness of the backup bearing on the circumference can have the same magnitude relative to each other. This can be achieved, for example, in that the outer ring is supported rigidly or almost rigidly on two opposing sections on a housing construction, while in the other, intermediate circumferential sections there is no or only softer support of the outer ring.

According to one alternative embodiment, on the circumference of the outer ring there are three minimum and maximum points of radial flexibility. Independent of the number of local minimum and maximum points of flexibility of the outer ring of the backup bearing on its circumference there are different circumferential sections on which the radial stiffness is selectively increased or decreased, preferably distributed asymmetrically on the circumference of the backup bearing. Here, in an especially effective way, resonance when supporting the shaft by the backup bearing is counteracted. In different circumferential regions, the radial stiffness of the backup bearing can vary step by step, wherein, for example, two or three different spring constants can be provided, each measured in the radial direction.

Likewise, embodiments can be realized in which the radial stiffness of the backup bearing changes continuously on the circumference.

The angle-dependent radial stiffness of the backup bearing can be realized, for example, in that a corrugated ribbon that supports the outer ring with angle-dependent flexibility relative to the housing construction is arranged between the outer ring and the housing construction.

Another possibility for forming an angle-dependent stiffness of the outer ring is in the use of an outer ring with a non-uniform wall thickness—also without the use of a part acting purely as a spring and/or damping element. Such an outer ring advantageously contacts only at some points or circumferential sections on the housing construction, while the outer circumferential sections enable cushioning of the backup bearing in the radial direction.

For a backup bearing formed as a ball bearing, in particular, angled contact ball bearing, at least one of the parameters of pressure angle and osculation can be dependent on angle, in order to achieve the desired angle dependency of the radial stiffness. This measure can be combined with the previously explained shaping options, like varying the wall thickness of the outer ring or mounting flexible and damping elements, for example, corrugated ribbon sections.

A bearing assembly that has a magnetic bearing as a main bearing can advantageously be equipped with multiple backup bearings that are provided for supporting the same shaft and whose spring and damping properties differ from each other. Here, a first backup bearing can have resonance frequencies that are different from resonance frequencies of a second backup bearing, wherein the number of resonance frequencies of the first backup bearing can differ from the number of resonance frequencies of the second backup bearing.

The angle at which one of the backup bearings has extreme values of flexibility, especially in the radial direction, differ in an advantageous construction from the angles at which another backup bearing has extreme values of flexibility. In this simplest case, this can be achieved in that two identical backup bearings are installed in angular positions rotated relative to each other. Advantageously, however, backup bearings of different construction are used for support on different positions of the shaft, wherein differences both with respect to the average stiffness of the bearings and also with respect to the angular distribution of more flexible and stiffer regions are given on the circumference of the individual backup bearings.

BRIEF DESCRIPTION OF THE DRAWINGS

Several embodiments of the invention are explained in more detail below with reference to the accompanying drawings. Shown are, partially in schematic view.

DETAILED DESCRIPTION OF THE PREFERRED EMBODIMENTS

Figure 1:
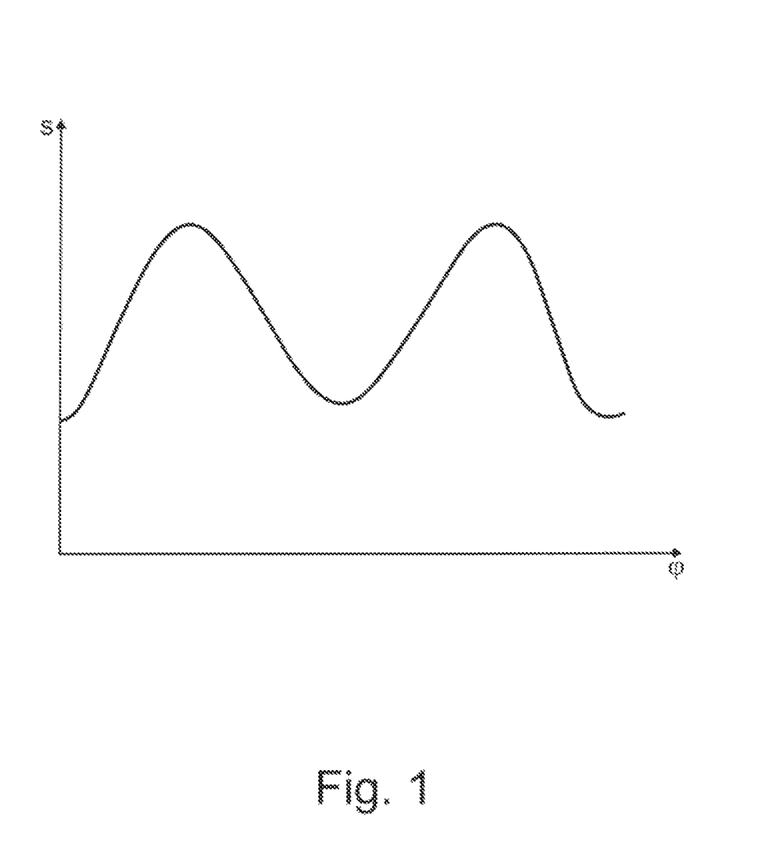
FIG. 1 in a diagram, the angle dependency of the radial stiffness of a backup bearing, FIG. 2 a first embodiment of a damped backup bearing, FIG. 3 a second embodiment of a damped backup bearing, FIG. 4 a third embodiment of a damped backup bearing, FIG. 5 a fourth embodiment of a damped backup bearing, FIG. 6 a fifth embodiment of a damped backup bearing, FIG. 7 in a diagram, the dependency of an oscillation amplitude of a backup bearing according to the invention on an excitation frequency acting on the backup bearing, compared with the resonance behavior of a conventional bearing assembly, FIG. 8 a first cross section of a backup bearing with angle-dependent bearing geometry, FIG. 9 a second cross section of a backup bearing with angle-dependent bearing geometry, FIG. 10 a third cross section of a backup bearing with angle-dependent bearing geometry, FIG. 11 a bearing assembly with magnetic bearing as a main bearing, as well as several different backup bearings.

In the diagram according to FIG. 1, one possible angle dependency of the radial stiffness S of a backup bearing constructed according to the invention is shown. The shown curve that has the shape of a harmonic oscillation, covers an angle $\phi$ from 0° to 360°, i.e., the full circumference of the backup bearing. Through measures that will be explained using examples below, it is ensured that the radial stiffness S has two minimum and two maximum points with respect to the entire circumference of the backup bearing, wherein, in the shown case, the two minimum and two maximum points each have an identical amplitude relative to each other and each extreme value is spaced apart 90° from the next extreme value. The variation of stiffness S of the outer ring of the backup bearing on its circumference is implemented, for example, just by the shape of the outer ring. Here, for example, a backup bearing outer ring with uniform wall thickness can be inserted into a cylindrical hole of a housing holding the backup bearing.

The backup bearing, whose radial stiffness S is shown in FIG. 1, can basically be formed as a sliding bearing, rolling bearing, or sliding/rolling bearing. For the case that it is shaped as a rolling bearing, it can be, for example, a roller bearing or a ball bearing. In the last case, the rolling bearing is advantageously formed as a two-row angular contact ball bearing, in particular, in an X or O arrangement. The uniformity of the flexibility on the circumference of the backup bearing can involve at least partially an angle-dependent pressure angle, an angle-dependent osculation between the rolling bodies and tracks, or a combination of angle-dependent pressure angle and angle-dependent osculation, as will be explained in more detail with reference to FIGS. 8 to 10. Alternatively or additionally, flexible and/or damping elements can be arranged outside of the outer ring of the backup bearing within the bearing assembly comprising the backup bearing. In all of the embodiments, the maximum of radial flexibility of the backup bearing differs advantageously by at least 5%, for example, at least 10%, at least 25% or at least 50%, from the minimum of flexibility.

Figure 2:
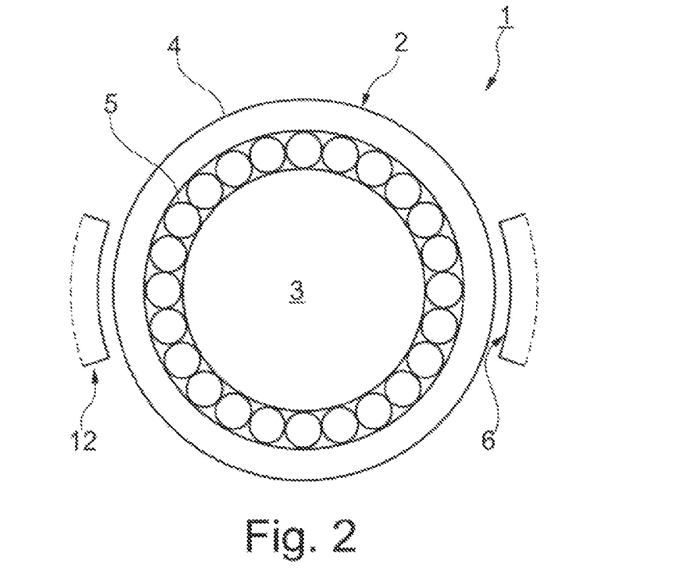

The embodiment according to FIG. 2 shows a bearing assembly designated overall with the reference symbol 1, which comprises a backup bearing 2 and a housing construction 12 only indicated in the figure, and has, in principle, the properties explained with reference to FIG. 1 just like the embodiments according to FIGS. 3 to 6.

The backup bearing 2 according to FIG. 2 is provided as a safety device for supporting a shaft 3 that is supported in normal operation by a not-shown magnetic bearing. Components of the backup bearing 2 are an outer ring 4 and a plurality of rolling bodies 5, namely balls. Deviating from the simplified diagram according to FIG. 2, the rolling bodies 5 do not roll directly on the shaft 3, but instead on a not-shown inner ring of the backup bearing 2 which is set apart from the shaft 3, during normal operation, by a small gap. Only if the magnetic bearing fails does the shaft 3 fall into and engage the inner ring, so that the backup bearing 2 comes into operation. The rolling bodies 5 are arranged without a cage between the inner ring and the outer ring 4 of the backup bearing 2. The backup bearing 2—more precisely: its outer ring 4—is supported only on two circumferential sections on the housing construction 12. A gap shown in FIG. 2 only for a clearer illustration is actually not present between the outer ring 4 and two support regions 6 of the housing construction 12. Instead, as long as the magnetic bearing is operating without errors, all of the components of the backup bearing 2 are still, while the shaft 3, as already explained, has at least a minimal distance to the backup bearing 2.

The two support regions 6 of the bearing assembly 1 according to FIG. 2 have no or only very minimal flexibility in the radial direction. The circumferential regions of the outer ring 4 in which this contacts the support regions 6, in particular, is pressed into the housing construction 12, correspond to the two maximum points of radial stiffness S according to FIG. 1. In contrast, the circumferential regions between the two support regions 6 form the minimum points of radial stiffness S of the outer ring 4. The radial stiffness S is to be understood as a spring constant and represents the reciprocal of the radial flexibility. In addition to the radial support, the backup bearing 2 according to FIG. 2 can also be supported in the axial direction with respect to the rotational axis of the shaft 3, wherein, in this case, also the axial stiffness of the bearing assembly 1 can be dependent on angle.

Figure 3:
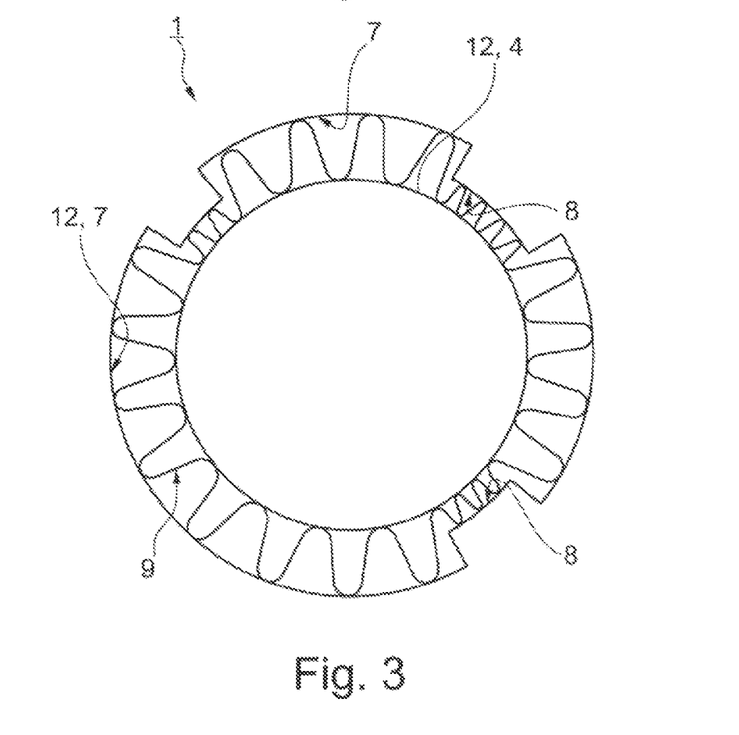

The embodiment according to FIG. 3 differs from the embodiment according to FIG. 2 initially in that the backup bearing 2 is embedded in the housing construction 12 on its entire circumference. In addition, in the embodiment sketched in FIG. 3, three circumferential sections 7 of increased radial flexibility and three circumferential sections 8 of reduced radial flexibility given. The radial flexibility is produced here, on one hand, from the properties of a corrugated ribbon 9, generally called a spring and damping element, which is mounted between the outer ring 4 and the housing construction 12, and, on the other hand, from the space available to the corrugated ribbon 9 within the different circumferential sections 7, 8. While the corrugated ribbon 9 takes up a wide space within the circumferential sections 7, only a relatively narrow gap between the outer ring 4 and the housing construction 12 is available to the corrugated ribbon 9 in the circumferential sections 8, which leads to a comparatively high radial stiffness S.

Each circumferential section 7, 8 extends across an angle that differs from each angle that one of the other circumferential sections 7, 8 takes up. The bearing assembly 1 according to FIG. 3 does not have point or mirror symmetry, wherein the production of resonance in the function takeover by the backup bearing 2 is counteracted.

Figure 4:
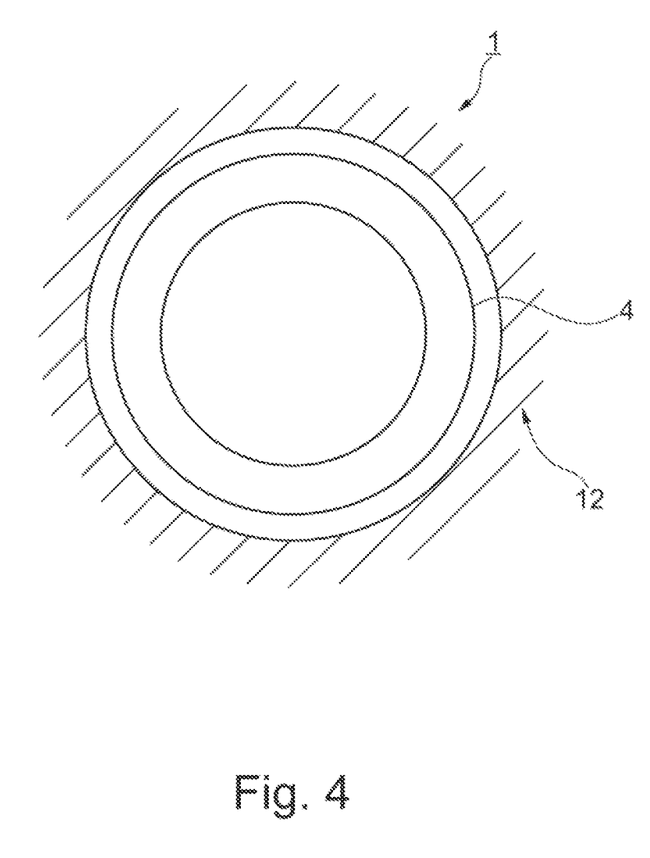

The bearing assembly sketched in FIG. 4 manages without separate spring and/or damping elements, as the embodiment according to FIG. 2 has, wherein, nevertheless, a pronounced angle dependency of radial stiffness S, as shown in FIG. 1, is given. The outer ring 4 of the backup bearing 2 according to FIG. 4 has a non-uniform wall thickness on its circumference and merely contacts narrow circumferential sections on the housing construction 12. The hole in the housing construction 12, in which the outer ring 4 is inserted, is cylindrical. The inner circumference of the outer ring 4 is also cylindrical. In a not-shown way, in those circumferential sections in which the outer ring 4 is spaced apart from the housing construction 12, there is a damping means, for example, an elastomer or a metal foam. Likewise, in a not-shown way, an anti-rotational lock can be realized between the outer ring 4 of the backup bearing 2 constructed as a rolling bearing and the housing construction 12.

Figure 5:
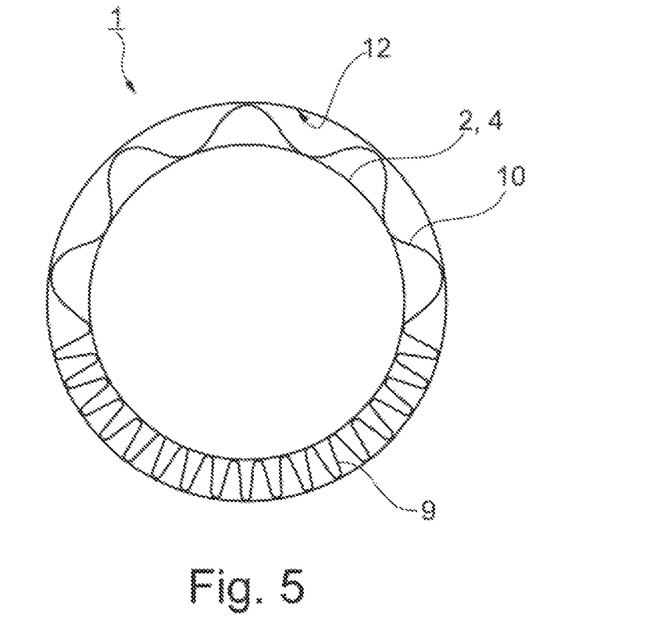

FIG. 5 shows an embodiment in which the outer ring 4 and the housing construction 12 have a symmetric construction. In the gap of constant width between the outer ring 4 and the housing construction 12, in this case, there is a section of a relatively stiff corrugated ribbon 9 and a section of a comparatively soft corrugated ribbon 10, that is, another spring and damping element. The circumference of the backup bearing 2 is essentially taken up by the different sections of corrugated ribbons 9, 10. The two transition regions between the corrugated ribbon 9 and the corrugated ribbon 10 can be shaped such that a local maximum of radial stiffness S of the backup bearing 2 occurs in each of these transition regions. The stiffer corrugated ribbon 9 is preferably installed, as shown in FIG. 5, in the lower region of the bearing assembly 1, so that the weight forces acting on the shaft 3 also can be received in this region.

Figure 6:
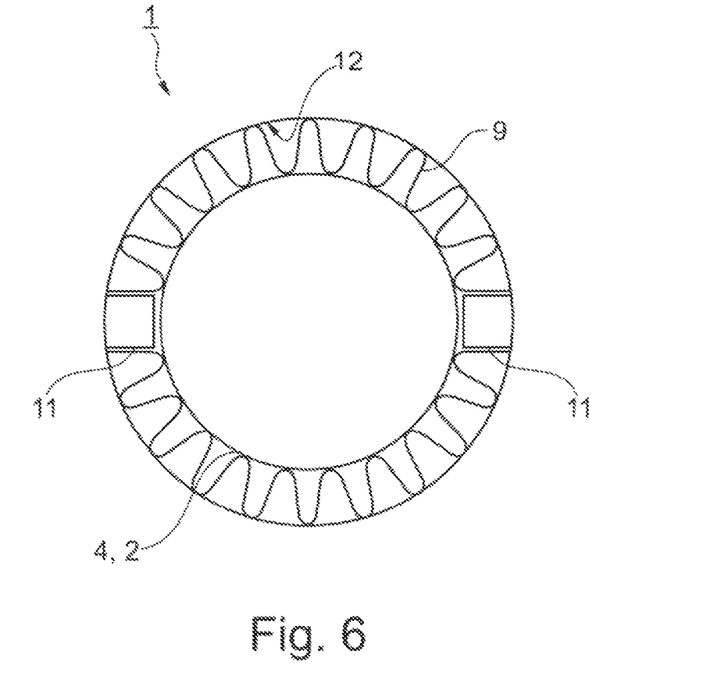

In the embodiment according to FIG. 6, in two narrow circumferential sections, the radial stiffness of the bearing assembly 1 is greatly increased by two blocks 11, in particular, made from metal, supporting the outer ring 4. In the other circumferential sections between the blocks 11 there is, in contrast, a corrugated ribbon 9 between the outer ring 4 and the housing construction 12. Deviating from the illustration according to FIG. 6, different properties can be arranged in these two circumferential sections, also sections of corrugated ribbons 9, 10, as sketched in FIG. 5.

Figure 7:
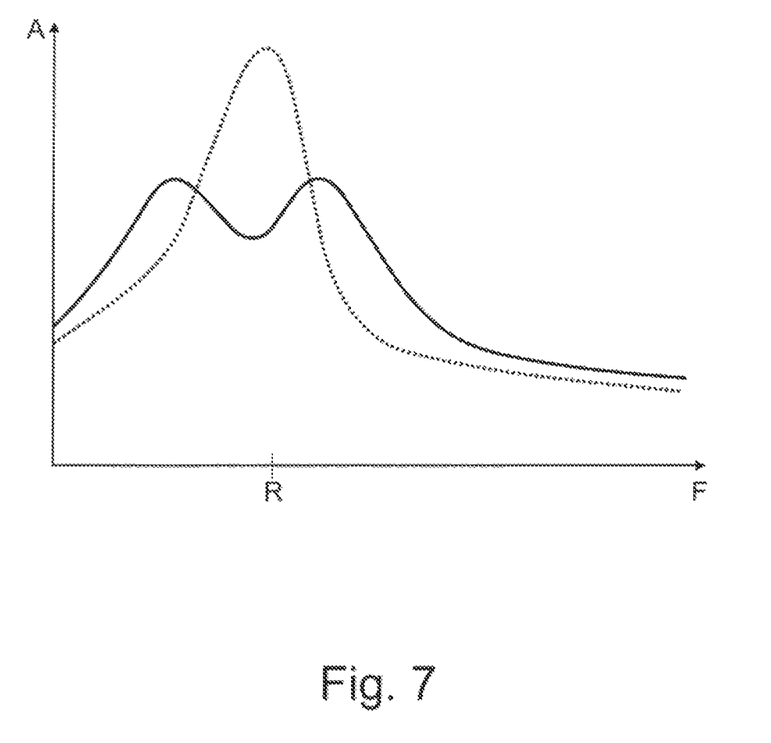

FIG. 7 shows a schematic comparison between properties of a bearing assembly 1 constructed according to the invention on one hand and a conventional bearing assembly with elastic properties on the other hand. The basic dependency of an oscillation amplitude A on an excitation frequency F is shown, wherein the behavior of a bearing assembly 1 according to the invention, as sketched, for example, in FIGS. 2 to 6, is shown by a solid line and the behavior of a conventional bearing assembly is shown by a dotted line for comparison.

In a typical, conventional bearing assembly, the oscillation amplitude has, at a certain excitation frequency, the resonance frequency R, a greatly pronounced maximum. Due to the oscillation-reducing shape of the bearing assembly 1, this maximum is prevented in each of the embodiments according to FIGS. 2 to 6. Instead, as can be seen in FIG. 7, several, relatively low maximum points of oscillation amplitude A are formed. Thus, there is no greatly pronounced resonance in the bearing assembly 1 during the entire runout of the shaft 3 supported by the backup bearing 2 after the failure of the magnetic bearing.

Figure 8:
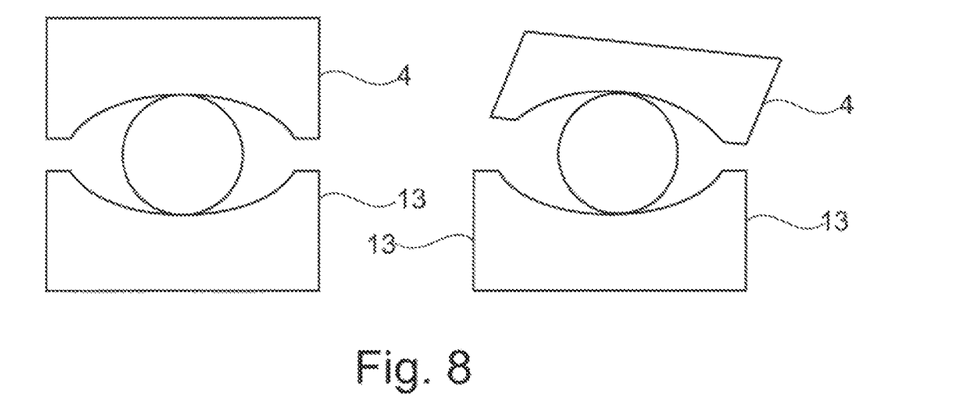
Figure 9:
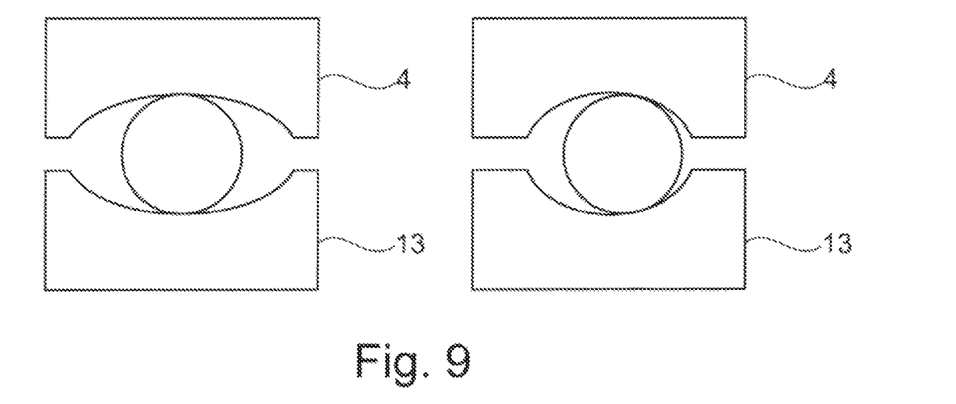
Figure 10:
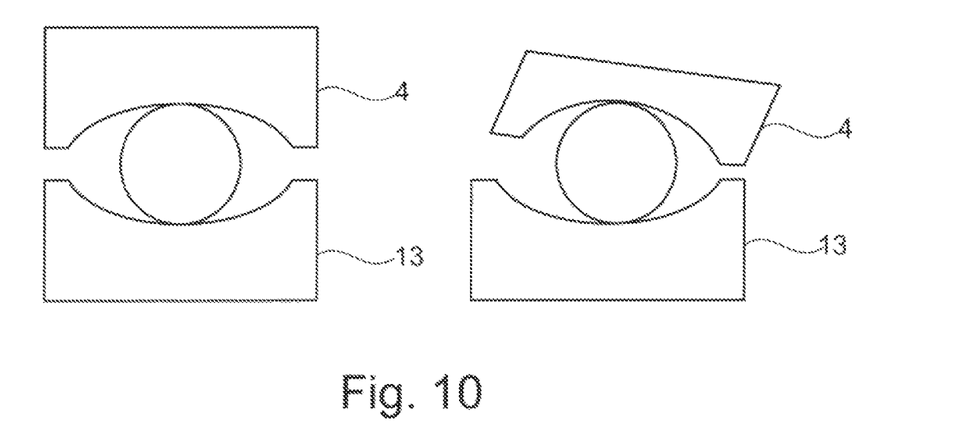

FIGS. 8 to 10 each show an embodiment of a backup bearing 2 that has an angle-dependent bearing geometry, wherein, in each of the three cases, the osculation and/or the pressure angle varies along the circumference of the backup bearing 2. In each case, in the left half of the figure there is a first cross section that relates to a first angle position, defined as the 0° position, and is equal in all cases. On the right, in each figure, for comparison a second cross section is shown that relates to a second angle position, for example, the 45° position or the 90° position.

In the backup bearing 2 shown in FIG. 8, the outer ring 4 and inner ring 13 have the same osculation. The radius of the track on the outer ring 4 corresponds in the shown cross section to the radius of the track on the inner ring 13. In the 0° position (left), the pressure angle is zero; the backup bearing 2 is thus a pure radial bearing. In contrast, in the second angle position (right), the pressure angle is significantly greater than zero. In this angle region, the rolling bodies 5 thus also transmit axial forces to a significant extent in addition to radial forces. The spring behavior differs significantly in the two shown angle regions. In particular, in the region in which the pressure angle is not zero, if the backup bearing 2 is loaded in the radial direction, a force component is also generated in the axial direction. The regions of different pressure angle transition continuously one into the other, wherein the difference between a minimum pressure angle and an enlarged pressure angle is shown exaggerated in FIG. 8.

In contrast to the embodiment according to FIG. 8, in the embodiment according to FIG. 9, the pressure angle does not vary, but instead the osculation along the circumference of the backup bearing 2 varies. While in the first angle region both the track of the outer ring 4 and also the track of the inner ring 13 is curved relatively slightly in comparison to the radius of the rolling bodies 5, this relates only to the inner ring 13 in the second angle region. For the outer ring 4, in contrast, the radius of curvature of the track is significantly closer to the radius of curvature of the balls 5, that is, tighter osculation (closer to 100%). The tighter osculation ensures that the balls 5 are less spring-like under the effect of a radial force than for other osculation values.

The embodiment according to FIG. 10 combines features of the embodiments according to FIGS. 8 and 9. As can be seen from the comparison of the two cross sections, in the second angle position of the backup bearing 2, both the pressure angle and also the osculation change relative to the first angle position. In each of the embodiments according to FIGS. 8 to 10, the inner ring 13 has along its entire circumference a constant cross-sectional geometry, while the cross-sectional geometry of the outer ring 4 is dependent on angle. Likewise, only the geometry of the inner ring 13 or the geometry of both rings 4, 13 could be dependent on angle.

Figure 11:
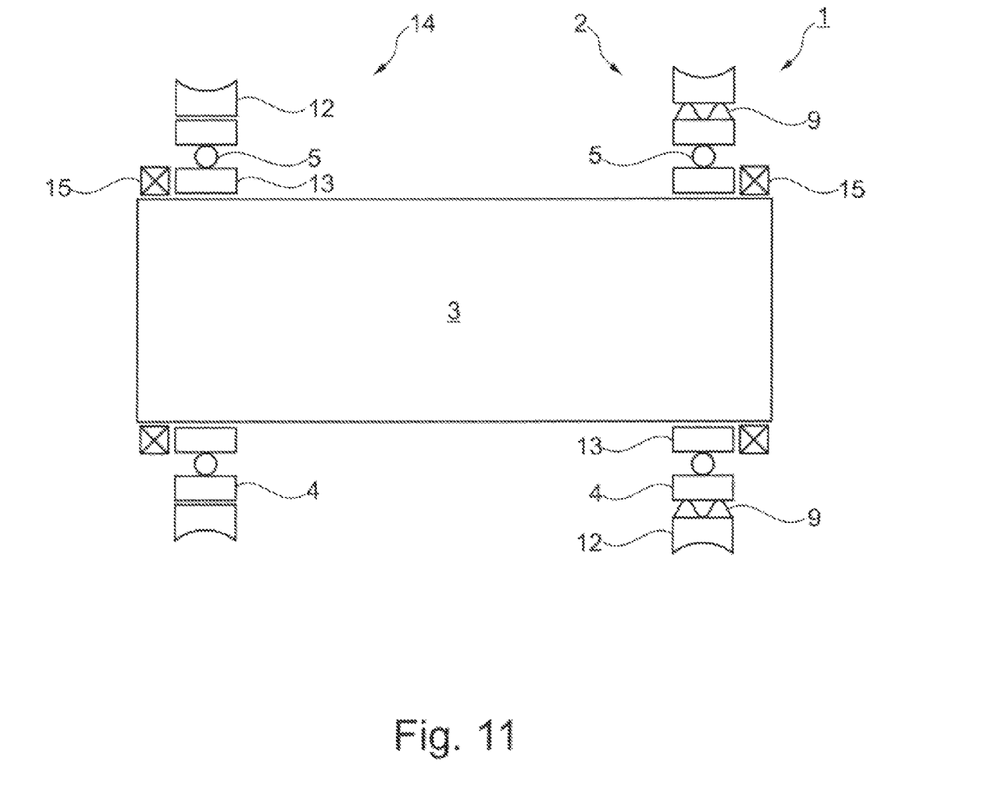

In FIG. 11, a bearing assembly 1 is sketched that has, in addition to a first backup bearing 2, a second backup bearing 14 that is provided for holding the same shaft 3 that is otherwise supported by means of a magnetic bearing 15. While the right backup bearing 2 in the arrangement according to FIG. 11 has a spring and damping element 9 corresponding to one of the previously explained construction possibilities, in the second backup bearing 14, other elastic properties are given. Each of the backup bearings 2, 14 has a specific resonance behavior. In particular, the number of resonance frequencies of the first backup bearing 2 differs from the number of resonance frequencies of the second backup bearing 14. Here, no resonance frequency of the first backup bearing 2 is identical to any resonance frequency of the second backup bearing 14. Each of the backup bearings 2, 14 has a flexibility in the radial direction that is dependent on angle. Here, it is assumed that a force vector normal to the rotational axis of the backup bearing 2, 14 acts from the shaft 3 toward the outside. Then angle at which the first backup bearing 2 has local or absolute extreme values of flexibility differ from the angles at which the second backup bearing 14 has local or absolute extreme values of flexibility.

In this way, two different backup bearings 2, 14 are provided that greatly differ from each other, especially with respect to their oscillation behavior, and thus overall provide a significant contribution to the most oscillation favorable properties of the bearing assembly 1.

LIST OF REFERENCE NUMBERS

1 Bearing assembly
2 Backup bearing
3 Shaft
4 Outer ring
5 Rolling body
6 Support region
7 Circumferential section
8 Circumferential section
9 Corrugated ribbon
10 Corrugated ribbon
11 Block
12 Housing construction
13 Inner ring
14 Backup bearing
15 Magnetic bearing
A Oscillation amplitude
F Excitation frequency
R Resonance frequency
S Stiffness
φ Angle

The invention claimed is:

1. A bearing assembly comprising a backup bearing that comprises a flexible outer ring arranged in a housing construction, a flexibility of the flexible outer ring has angle-dependent extreme values with at least one minimum and at least one maximum, and within 360°, there are more than two angles at which an at least local extreme value of flexibility of the outer ring is given with respect to a circumference of the outer ring, further comprising on the circumference of the outer ring, an asymmetrical angle partitioning between circumferential sections of increased flexibility and angle sections of reduced flexibility.

2. The bearing assembly according to claim 1, further comprising between the outer ring and the housing construction, a spring and damping element that supports the outer ring with angle-dependent flexibility with respect to the housing construction.

3. The bearing assembly according to claim 1, wherein exactly two of the minimum points and two of the maximum points of flexibility are given.

4. The bearing assembly according to claim 1, wherein the two minimum points and the two maximum points are equal in magnitude to each other.

5. The bearing assembly according to claim 4, wherein the outer ring is supported on exactly two sections of the circumference thereof opposite each other on the housing construction.

6. The bearing assembly according to claim 1, wherein exactly three of the minimum points and three of the maximum points of flexibility are given.

7. The bearing assembly according to claim 1, wherein the maximum of flexibility differs by at least 5% from the minimum of flexibility.

8. The bearing assembly according to claim 1, wherein the backup bearing is constructed as a ball bearing, at least one of the parameters of pressure angle, osculation, or wall thickness of a bearing ring is dependent on angle.

9. The bearing assembly according to claim 1, wherein the backup bearing has an oscillation amplitude (A) dependent on an excitation frequency (F) or excitation direction with at least two maximum points.

10. A bearing assembly comprising a backup bearing that comprises a flexible outer ring arranged in a housing construction, a flexibility of the flexible outer ring has angle-dependent extreme values with at least one minimum and at least one maximum, and within 360°, there are more than two angles at which an at least local extreme value of flexibility of the outer ring is given with respect to a circumference of the outer ring, further comprising a second backup bearing having spring and damping properties that differ from spring and damping properties of the first backup bearing.

11. The bearing assembly according to claim 10, wherein the two backup bearings have different resonance frequencies.

12. The bearing assembly according to claim 10, wherein the first backup bearing has multiple extreme points of flexibility on the circumference, having a number that deviates from a number of extreme points of flexibility of the second backup bearing.

* * * * *